UNITED STATES PATENT OFFICE.

CHARLES WEIZMANN AND DAVID ALLISTON LEGG, OF LONDON, ENGLAND.

PRODUCTION OF SECONDARY BUTYL ALCOHOL.

1,408,320.     Specification of Letters Patent.     Patented Feb. 28, 1922.

No Drawing.     Application filed November 10, 1917. Serial No. 201,403.

*To all whom it may concern:*

Be it known that we, Dr. CHARLES WEIZMANN, a subject of the King of Great Britain and Ireland, and residing at 41 Campden House Road, Kensington, London, W. 8, England, and DAVID ALLISTON LEGG, a subject of the King of Great Britain and Ireland, and residing at 15 Sisters Avenue, north side, Clapham Common, London, S. W., England, have invented certain new and useful Improvements Relating to the Production of Secondary Butyl Alcohol, of which the following is a specification.

This invention relates to the manufacture of secondary butyl alcohol from normal butylenes or normal butenes.

The conversion of normal butenes $CH_3CH=CH.CH_3$ and $CH_2=CHCH_2CH_3$ into the corresponding secondary alcohol $CH_3CHOH.CH_2CH_3$ by adding the elements of water can theoretically be carried out by dissolving these butenes in concentrated sulphuric acid, but practically it is found that the yields of the alcohol are rather small, as a good deal of the butene becomes polymerized before being converted into the secondary alcohol.

The invention consists in mixing intimately at a suitable temperature sulphuric acid with normal liquefied butenes until absorption is effected, and then distilling the solution, whereby secondary butyl alcohol is obtained.

In carrying this invention into effect in one way, by way of example, we take say 50 grammes of 75% sulphuric acid, and cool it to such a temperature that when the butenes are passed through it, the latter liquefies on the top. This is conveniently 10° to 15° centigrade. 30 grammes of butylene should be taken for the above quantity of sulphuric acid. The vessel is hermetically closed, and the liquids thoroughly mixed, say by shaking. After a time the butylene disappears, being dissolved in the acid. The reaction may be effected at ordinary temperatures under pressure.

The liquid is then distilled with steam, when practically pure secondary butyl alcohol is obtained.

The above indicated quantities of the reagents may be widely varied.

Having now described our invention, what we claim as new and desire to secure by Letters Patent is:—

1. A process for producing secondary butyl alcohol from normal butenes consisting in mixing a normal butene in a liquid state with sulphuric acid of about 75 per cent concentration by weight and distilling the product.

2. A process for the production of secondary butyl alcohol from normal butenes which consists in cooling sulphuric acid of approximately 75 per cent concentration by weight, adding a liquid normal butene thereto, thoroughly incorporating the mixture and distilling the resultant liquor with steam.

In testimony whereof we have signed our names to this specification.

CHARLES WEIZMANN.
DAVID ALLISTON LEGG.